US006311075B1

(12) United States Patent
Bevan et al.

(10) Patent No.: US 6,311,075 B1

(45) Date of Patent: Oct. 30, 2001

(54) ANTENNA AND ANTENNA OPERATION METHOD FOR A CELLULAR RADIO COMMUNICATIONS SYSTEM

(75) Inventors: David Damian Nicholas Bevan, Bishops Stortford; Steven John Baines, Stansted Mountfichet, both of (GB)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/198,385

(22) Filed: Nov. 24, 1998

(51) Int. Cl.[7] .................................................. H04B 1/38

(52) U.S. Cl. .......................... 455/562; 455/522; 455/446; 455/25; 343/879; 343/891; 342/368

(58) Field of Search ..................... 455/446, 25, 561–562, 455/129, 272, 522, 69–70; 343/874, 875, 879, 890–891; 342/368

(56) References Cited

U.S. PATENT DOCUMENTS

| | | | | |
|---|---|---|---|---|
| 4,249,181 | | 2/1981 | Lee . | |
| 5,408,679 | * | 4/1995 | Masuda | 455/562 |
| 5,440,318 | | 8/1995 | Butland . | |
| 5,551,060 | * | 8/1996 | Fujii et al. | 455/562 |
| 5,576,717 | | 11/1996 | Searle . | |
| 6,052,582 | * | 4/2000 | Blasing et al. | 455/562 |

FOREIGN PATENT DOCUMENTS

| | | |
|---|---|---|
| 0 531 090 | 3/1993 | (EP) . |
| 0 575 808 | 12/1993 | (EP) . |
| 0 593 822 | 4/1994 | (EP) . |

* cited by examiner

*Primary Examiner*—Doris H. To

(57) ABSTRACT

A conventional antenna 114 at a cell site of a sectored cell in a cellular radio communications system has a low angle of coverage in elevation and therefore has low gain for close-in subscriber units (near the cell site). In a sectored cell, a main beam antenna in a first sector generates side-lobes and backlobes which may fall within the close-in area in other sectors. A close-in mobile in one of the other sectors may move into such an out-of-sector lobe and cause unexpected interference to the base station transceiver (BTS) of the first sector. A downward-looking antenna (DIA) 110 supplements the conventional antenna in each sector and has a beam 112 covering the close-in area. The gain of the DLA beam is greater than that of any out-of-sector lobes and so provides a subscriber unit with a higher gain link to the BTS of its own sector than is provided by out-of-sector lobes to the BTS of any other sector.

25 Claims, 6 Drawing Sheets

ANTENNA AND ANTENNA OPERATION METHOD FOR A CELLULAR RADIO COMMUNICATIONS SYSTEM

TECHNICAL FIELD

This invention relates to an antenna for a cellular radio communications system and a method of operation of the antenna. The invention relates in particular to multi-beam, or sectored, cells.

BACKGROUND OF THE INVENTION

Cellular radio communications systems are widely used throughout the world to provide telecommunications to mobile users. A geographic area covered by a cellular radio system is divided into cells, each containing a cell site, through which subscriber units, such as mobile stations, communicate.

In general, an object of cellular radio communications system design is to reduce the number of cell sites required by increasing their range and/or capacity. This is because cell sites are expensive, both because of the equipment required and because of the need for a geographical site for each cell site. Geographical sites may be costly and may require extensive effort to obtain planning permission. In some areas, suitable geographical sites may even not be available.

The communications ranges in many systems are uplink (mobile to cell site) limited because of the limited power available at the subscriber unit, which may be a hand-portable subscriber unit. However, any increase in range would mean that fewer cells would be required to cover a given geographical area, thus advantageously reducing the number of cell sites and associated infrastructure costs.

When a cellular radio system is set up in an area of high demand, such as a city, then cell site communications capacity, rather than range, usually limits cell size. An increased cell site capacity would therefore reduce the required number of cell sites and so reduce costs, or for the same cell size, would deliver increased revenue from call charges.

After a cellular radio system has been set up, demand may increase to exceed the capacity of the existing cell sites. A method of upgrading existing cell sites to increase capacity where required might then reduce costs because the capacity of the system could be increased without acquiring any new geographical sites for cell sites or installing a greater number of cell sites.

One approach to increasing range and/or capacity, or to upgrade a cell, is to use directional antennas at a cell site physically to separate radiations at similar frequencies. This is known as sectorisation. It has been proposed to use three-sectored cells, having three antennas with nominally 120° azimuthal beamwidth, or hex-sectored cells, having six antennas with nominally 60° azimuthal beamwidth (as described for example in U.S. Pat. No. 5,576,717). In each case, one effect of the sectorisation is to reduce interference from mobiles and cell sites in adjacent and nearby cells, and thus to increase the total range and/or capacity of the cell site in a sectored cell relative to a cell using an omni-directional antenna.

However, there are problems which arise from the sectoring approach, particularly as the number of sectors increases. In any cellular system, a subscriber unit may move from one cell to another, necessitating transfer of the communication link from one cell site to another by a process known as handoff. In a sectored cell, a subscriber unit may also move from one sector to another, necessitating additional handoffs between the sectors of a cell site. Clearly, as the number of sectors increases, so does the number of handoffs, making increasing demands on the processing and communications capacity of the system.

A particular problem which is exacerbated as sectorisation increases is that a sectored cell site antenna is designed to produce a particular beam shape to cover its sector but may also produce sidelobes and backlobes, including elevation sidelobes and backlobes. These are likely to fall within sectors covered by the principal beams of other antennas at the same cell site, in which case they may be termed out-of-sector sidelobes and backlobes. (In this context, and throughout this document, the term principal beam is used to mean either a main beam or a diversity beam of a sector or a cell). As sectorisation increases, each antenna in a cell must be designed to form a beam having a decreased angular azimuthal width. This makes it more difficult for the designer to control the sidelobes and backlobes of the antenna. Also, as sectorisation increases, it becomes more likely that sidelobes and backlobes will fall within sectors covered by other antennas because there are more, narrower, sectors surrounding the cell site.

This aspect of sectorisation can cause a problem when a subscriber unit moves, within a first sector, from the principal beam of a first antenna covering the first sector into an out-of-sector sidelobe or backlobe of a second antenna, the principal beam of which covers a second sector. First, this may lead to an unexpected handoff between sectors (which may be non-adjacent), where in fact no handoff may have been necessary or desirable. Second, if the subscriber unit was communicating via the principal beam of the first antenna at a point where the principal beam gain is low, then it will have been transmitting at high power. When the subscriber unit then moves into the out-of-sector sidelobe or backlobe of the second antenna, the signal received by the second antenna may be very powerful and may interfere with or even swamp existing communications from other subscriber units to the second antenna. The subscriber unit may hand off to the second antenna, after which a power control signal can be transmitted from the cell site to reduce the subscriber unit transmission power, but until then, communications between the second antenna and other subscriber units may be adversely affected (this is known as the "near-far" effect).

One mode of communication used in cellular radio systems in which this problem may be particularly acute is spread spectrum communication, such as code division multiple access (CDMA). In such systems, all cell site transmissions, both in different sectors and in different cells, may be in the same frequency band.

This means that a subscriber unit moving from the principal beam of one antenna into an out-of-sector sidelobe or backlobe of a second antenna will always be transmitting on the same frequency as subscriber units already communicating via the second antenna, exacerbating the problem of interference (swamping) described above.

The description above assumes for simplicity that each principal beam covering a sector is generated by a separate antenna. However, in some sectored cells, a single antenna may generate the principal beams covering more than one sector. In that case, depending on the handoff mechanism between sectors, a similar problem may arise if a sidelobe or backlobe of one sector overlaps a second sector generated by the same antenna.

SUMMARY OF THE INVENTION

An object of the present invention is to identify subscriber units, such as mobile stations, moving close to the cell site of a cell in order to improve the handling of communications with those subscriber units.

Another object of the present invention is to overcome the problem of handling a moving subscriber unit in a sectored cell, in particular when the subscriber unit is moving close to the cell site.

A further object of the invention is to overcome the problem of interference caused by a subscriber unit moving from a principal beam covering one sector in a sectored cell into a sidelobe or backlobe of a principal beam of a second sector of the same cell site.

The invention provides, in various aspects, an antenna for a sectored cell, a cell site for a sectored cell and a method for operating a sectored cell as defined in the appended independent claims. Preferred or advantageous features of the invention are defined in dependent subclaims.

In a first aspect, the invention provides at a cell site of a sectored cell a downward-looking antenna (DLA) which provides a beam covering an area of a first sector of the cell in which a principal beam covering the first sector overlaps a sidelobe or backlobe of a principal beam covering a second sector. The area covered by the DLA beam is advantageously the close-in area, near the cell site, beneath the principal area of coverage of the principal beam.

In a second aspect, the invention provides a method for operating such a DLA so as to allow a base transceiver station (BTS) to control the power transmitted by close-in mobiles (subscriber units in the close-in area) in the sector handled by that BTS. This may advantageously reduce interference to BTSs handling other sectors caused by the transmissions of subscriber units being carried via sidelobes or backlobes.

The invention finds particular advantage in CDMA systems, in which interference to BTSs handling other sectors may be very severe. However, the invention may be advantageously applied to other communications systems.

The DLA of the invention may therefore advantageously supplement a conventional antenna or antennas in each sector. The gain of the DLA beam, which covers the close-in area, is preferably greater than that of any out-of-sector sidelobes or backlobes in order to provide a mobile station with a higher gain link to the BTS of its own sector than is provided by out-of-sector sidelobes or backlobes to the BTS of any other sector.

Although the invention relates to subscriber units in general, the following specific description refers, by way of example, to mobile stations.

DETAILED DESCRIPTION OF THE SPECIFIC EMBODIMENTS

Specific embodiments and the best mode of the invention will now be described by way of example, with reference to the drawings, in which.

The following specific description relates principally, but not exclusively, to cells referred to as TC3S and TC9S cells, which are a conventional three-sectored cell and a proposed nine-sectored cell respectively. The description will briefly describe these cell types, and then discuss relevant aspects of CDMA communications technology, before considering the particular cell types in the context of the invention in more detail.

Figure 1:
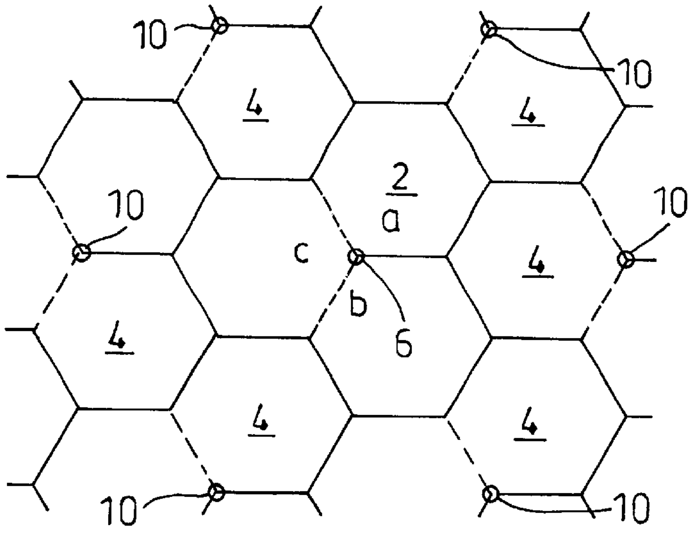
FIG. 1 is a schematic plan view of a portion of a conventional cellular communications network, including a three-sectored cell.

FIG. 1 shows a portion of a cellular communications network in which a conventional three-sector cell 2 is surrounded by neighbouring cells 4 in a network of cells. The cell comprises three 120° sectors a,b,c surrounding its centre, where a cell site is situated, for example at an antenna mast. The overall cell shape is formed of three approximately hexagonal lobes, each having a corner at the cell centre. Each sector approximately covers a respective one of the hexagonal lobes, termed corner-excited hexagons. The figure shows only the nominal beam footprints for the three sectors. At the cell site is situated a BTS (base transceiver station) 6 for handling communications with mobile stations in each sector. In this TC3S cell, for example, a single Nortel IS-95 CDMA BTS is used, which can handle communications in up to three sectors, i.e. all sectors in the three-sector cell. This BTS is manufactured by Northern Telecom Limited, World Trade Center of Montreal, 380 St. Antoine Street West, 8th Floor, Montreal, Quebec H2Y 3Y4, Canada. Other cells in the network may contain similar BTSs or different BTSs.

Figure 2:
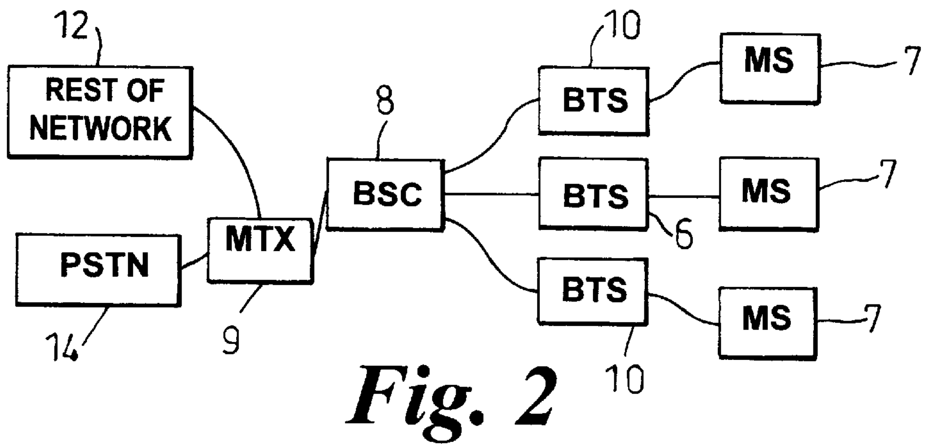
FIG. 2 is a block diagram of a cellular communications network such as that of FIG. 1.

As shown in FIG. 2, the BTS 6 communicates with a number of mobile stations 7 and is connected to a base station controller (BSC)8, which may be some distance from the cell. The BSC is also connected to the BTSs 10 of nearby cells, and via a MTX (mobile telephone exchange)9 to the remainder of the mobile network 12 and, typically, to the public switched telephone network (PSTN) 14.

The three-sector BTS 6 controls communication with mobile stations within all three sectors of its cell and as a mobile station moves from one sector to another it can control handoffs substantially without reference to the BSC (although the BSC is informed of each handoff). These are termed softer handoffs, and contrast with handoffs as mobile stations move from one cell to another. The latter can only be controlled by the BSC instructing the BTSs of both cells, and are termed soft handoffs.

Figure 3:
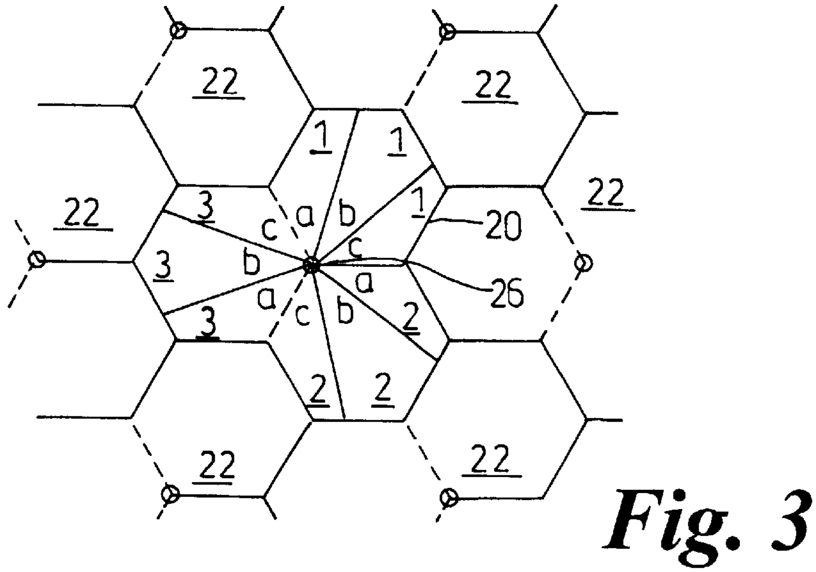
FIG. 3 is a schematic plan view of a portion of a cellular communications network, including a nine-sectored cell.

A proposed nine-sector (TC9S) cell 20 is shown in FIG. 3, surrounded by neighbouring cells 22 in a cell network.

This cell 20 comprises nine sectors a1, b1, c1, a2, b2, c2, a3, b3, c3 of approximately 40° surrounding its centre. In FIG. 3, only the nominal downlink (forward link) beam footprints for the sectors are shown. The uplink (reverse link) antenna configuration of this type of cell will be discussed later.

The overall shape of the nine-sector cell 20 is similar to that of the three-sector cell 2 in FIG. 1. However, at the cell centre are three, three-sector BTSs 26, each similar to the BTS 6 in the three-sector cell. Each three-sector BTS 26 controls three adjacent sectors a, b, c covering one of the hexagonal lobes of the cell. Thus, conceptually, the pattern of the three 120° sectors of the BTS 6 in the three-sector cell in FIG. 1 has been compressed into each 120° area in the nine-sector cell. Each group of three sectors, in this case forming a larger, 120° sector, controlled by a single BTS will be referred to herein as a trisector.

Figure 7:
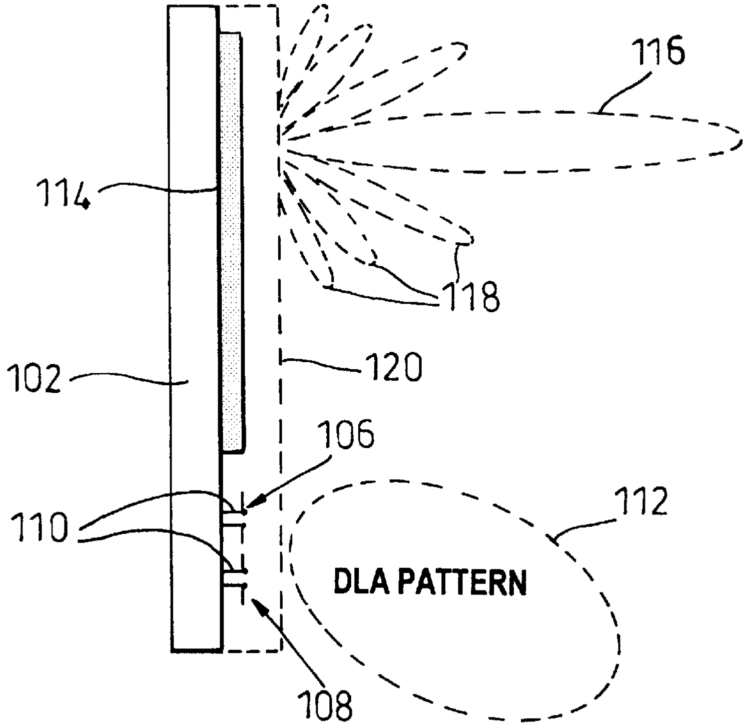
FIG. 7 is a side view of the antenna unit of FIG. 6.

Although the TC3S and TC9S cells illustrated in FIGS. 1 and 7 comprise three corner-excited hexagons, the invention described here in is not limited to this cell shape, but may be applied to any suitable cell shape or geometry. For example, TC3S and TC9S cells may be centre-excited hexagons.

Each three-sector BTS in a TC9S cell is connected independently to the BSC. The three co-located BTSs are not connected to each other. This means that substantially the same type of BTS hardware and software may be used in a three-sector cell as in a nine-sector cell, which significantly enhances the flexibility of the system. For example, not all of the cells in a network need to be the same. A nine-sector cell may be able to handle more calls from mobile stations but is more expensive to install than a three-sector cell. Therefore, a network may comprise mostly three-sector cells, with nine-sector cells only in areas of high demand.

As well as the three- and nine-sectored cells described, a six-sectored cell may be implemented using two IS-95 BTSs (or other three-sector BTSs). Each BTS then covers three 60° sectors, which form a larger, 180° sector (similar to a trisector in TC9S). In principle, a cell containing any multiple of three sectors, such as 12 or 15, may be implemented using IS-95 BTSs (or other three-sector BTSs) in this way.

Background Technology—Code Division Multiple Access

CDMA is a modulation and multiple access scheme based on spread spectrum communication, a well-established technology that has been applied recently to digital cellular radio communications. Multiple access allows simultaneous communications on many channels between a BTS and a number of mobile stations. In CDMA, these channels are carried in the same, relatively broad, band of frequencies. The bandwidth is typically 1.25 MHZ in IS-95. The signal (assumed to be vocoded, coded, interleaved etc.) in each CDMA channel is spread with a different pseudo-random (PN) binary sequence before being used to modulate an RF carrier. A large number of CDMA signals can share the same frequency band. The signals are separated in a receiver using a correlator, which isolates a particular channel by accepting only signal energy from the selected PN sequence assigned to that channel and despreads its spectrum. Signals on other channels, whose PN sequences do not match, are not despread and, as a result, contribute only weakly to the noise and represent a self-interference generated by the system.

Further background information about CDMA is given in "New Concepts in Multi-user Communications": Proceedings from The Advanced Study Institute Conference on Concepts in Multi-user Communication, Ed. J. K. Skwirzynski. NATO, UK, Aug. 4–16, 1980, which is incorporated herein by reference.

The use of CDMA in mobile communications is specified by Telecommunications Industry Association/Electronics Industry Association (TIA/EIA) standards and draft standards, which are all incorporated herein by reference, including TIA/EIA/IS-95-A, Mobile Station-Base Station Compatibility Standard for Dual-Mode Wideband Spread Spectrum Cellular System, May 1995, Specification, January 1992.

Conventional Power Control In CDMA

A cell in a CDMA system can contain many mobile stations transmitting signals and receiving signals from the cell site on separate channels but all using the same frequency band. Although the signal carried by each channel is individually coded, the signals on all the other channels sum to produce interference, or noise, at the receiver of that particular channel.

Each CDMA receiver at the BTS converts a CDMA signal from one of the mobile station transmitters into a signal that carries narrowband digital information. At the same time, the other signals (on other channels) that are not selected remain wide-bandwidth noise signals. The bandwidth reduction processing, commonly called processing gain, increases the signal-to-interference ratio (in dB) from a (typically) negative value to a level that allows signal reception with an acceptable bit error rate.

The capacity of the CDMA system in terms of the number of simultaneous telephone calls that can be handled in a given frequency bandwidth is therefore maximized if the transmit power of each mobile station is controlled so that signals arrive from all mobile stations at the BTS with the same nominal power, which results in the minimum possible signal-to-interference ratio for all mobile stations.

If a mobile station's signal arrives at the cell site with a lower level of received power, then the mobile station's performance is degraded. If the received power is higher, the performance of this mobile station is improved, but interference to all the mobile station transmitters that are sharing the channel is increased, and may result in unacceptable performance to other users unless the power is reduced. This is known as the "near-far" effect.

Uplink-open-loop power control, uplink-closed-loop power control, and downlink power control are conventionally employed.

Uplink-open-loop power control is primarily a function of the mobile stations. Each mobile station measures the received power level from the BTS and rapidly adjusts its transmitter power in an inversely proportional manner, using a calibration constant provided by the BTS. The calibration constant is sensitive to the cell load, cell noise figure, antenna gain, and power amplifier output. This constant is sent as part of a broadcast message from the BTS to the mobile stations.

The BTS takes an active role in the uplink-closed-loop power control functions. The goal of the closed-loop power control is for the BTS to provide rapid corrections to each mobile station's open-loop power control estimate (as described above) to maintain the optimum mobile station transmit power. The BTS measures the relative received power level of each mobile station's signal and compares it to an adjustable threshold. A determination is made regularly, for example every 1.25 ms, to either transmit a power-up command or a power-down command to each mobile station. This closed-loop correction to any variation required in the open-loop estimate accommodates, for example, gain tolerances, unequal propagation losses and (for a slow-moving mobile) Rayleigh fading between the downlink and the uplink for each mobile station.

The cell supports downlink power control by adjusting the downlink power for each channel in response to measurements provided by the respective mobile station. The purpose is to reduce power for mobile stations that are, for example, stationary, impacted little by multipath fading and shadowing effects, or experiencing minimal other cell interference. Thus, extra downlink signal power can be given to mobile stations that are either in a more difficult environment or far away from the cell and experiencing high error rates.

Conventional CDMA Pilot Signals

A different pilot signal is transmitted in each sector, which is used by each mobile station to obtain initial system synchronization and to provide robust time, frequency, and phase tracking of the signals from the BTS. This signal is tracked continuously by each mobile station. Variations in the transmitted power level of the pilot signal control the coverage area of the cell in known manner.

Conventional Diversity Reception

Multipath propagation of a wideband CDMA signal or the transmission of signals in more than one sector or cell usually gives rise to a plurality of independently receivable signals at a receiver. A CDMA receiver at a mobile station usually comprises a rake receiver consisting of several, such as three or four, parallel correlators (or fingers). Each multipath signal carries the same information but may arrive with a different delay, and may be tracked and received independently by one of the fingers. The combination of the strengths of the signals received by the respective fingers is then used by a diversity combiner to demodulate the signal.

The multiplicity of fingers at a mobile station allows the simultaneous tracking of signals from more than one cell. This is critical to the handoff procedure, as described below.

Conventional Mobile-Station-Assisted Soft Handoff

A handoff mechanism allows a telephone call to continue when a mobile station crosses the boundary between two cells or sectors.

A soft handoff in a CDMA system occurs when a mobile station moves from an area served by a first BTS to an area covered by a second BTS. This can be a movement from one cell to another or between sectors covered by different BTSs in the same cell. Each BTS broadcasts a pilot signal in each sector which it covers. The strength of each pilot signal determines the area of coverage of each sector in known manner.

At call initiation, a mobile station is provided with a list of BTSs or cell sectors which are most likely candidates for a handoff during the call, a set of handoff signal-strength thresholds (including an add threshold and a drop threshold), a strength margin and a time margin.

A CDMA mobile station typically has a rake receiver with three receiver fingers and a searcher (though some types may have more). In the typical case the mobile station may assign one finger to track the signal from the BTS which set up the call and two fingers to track the strongest other two BTS signals from the list, while the searcher scans for other useful signals. The searcher finger may not only monitor the strengths of pilot signals from other BTSs on the list but may also find other pilot signals from other, new BTSs, in which case it may cause the mobile station to modify its list of candidates for soft handoff. The list is transmitted to the BSC whenever it is requested, whenever the list changes by having a new pilot appear on the list, or whenever an existing pilot falls below a level that is useful to support the communications traffic.

When a mobile station communicating via a first BTS moves away from the area of coverage of the first BTS towards that of a second, the pilot signal strength from the second BTS typically increases until it exceeds the add threshold. At this time, the mobile station sends a control message via the first BTS to the BSC. The BSC responds by commanding the mobile station to commence communicating with the second BTS as well as the first, and commanding the second BTS to commence transmitting and receiving the telephone call data to and from the mobile station. The mobile station then uses diversity combining of the two signals to enhance the overall received signal. Power control information is received from both BTSs; both BTSs have to request a power increase for the mobile station to increase its power. (Uplink-open-loop power control, uplink-closed-loop power control, and downlink power control are employed in known manner). Data from the mobile station are received by both BTSs and are forwarded to the BSC where the better (BTS) source is selected on a frame-by-frame basis. (Diversity combining is not generally used at the BSC, although in principle it could be used).

It will be appreciated that a BTS manages handoffs differently from a mobile station. Each BTS therefore continues to broadcast only its pilot signal (and sync, paging and other traffic channels) unless the BSC tells it that the mobile station has received the pilot signal sufficiently strongly (above the add threshold) to request that a communications link be set up with that BTS. Under the control of the BSC, the BTS then forms one of the two or more links on which communications are carried during the soft handoff.

During this state of two(or more)-way linkage, the mobile station is said to be in soft handoff.

The two-way linkage described above can be terminated in several ways depending on the movement of the mobile station. It can be terminated by returning to the first BTS only, or by dropping the first BTS in favour of the second, or by initiating tracking another BTS prior to completion of the handoff. In each case a communications link is dropped if the signal strength received at the mobile station on that link falls below the drop threshold for longer than the time margin.

Signal strength in CDMA is in practice evaluated in terms of the parameter $E_C/I_O$, which is the ratio of energy per chip to the noise power spectral density in a received CDMA signal.

Conventional Softer Handoff

As is known from the prior art, a softer handoff is the mechanism for handling the link between a mobile station and a BTS when the mobile station moves between two sectors of a cell covered by the same BTS, as in a TC3S cell. In a softer handoff, the mobile station functions exactly as in a soft handoff, as described above, but the BTS functions differently. As for a soft handoff, if a mobile station detects a pilot signal rising above the add threshold it sends a command message to initiate a handoff. The mobile station cannot know whether this will be a soft or softer handoff.

In a soft handoff, the BTS receiving the command message passes it to the BSC which controls the handoff procedure. But if the BTS receives a command message requesting initiation of a handoff between two of its own sectors, it intercepts the command message and directly initiates transmission and reception in the new sector. The BTS thus provides a parallel, two-way (or more) linkage during softer handoff as is provided by two or more BTSs during soft handoff. The BTS uses a diversity combiner to combine signals received from the mobile station in each sector, thus increasing diversity until the softer handoff is completed, for example by termination of either the link in the original sector or the link in the new sector, depending on the movement of the mobile station.

During softer handoff, the BSC is notified of the procedure but does not participate directly.

Structure and Operation of a 9-Sector TC9S Cell

As described above and illustrated in FIG. 3, a TC9S cell comprises three co-located IS-95 BTSs at its centre, each handling a trisector composed of three 60° sectors. Therefore, if a mobile station moves within the cell from one sector to another, a softer handoff is required if both sectors are handled by the same BTS and a soft handoff will be required if the sectors are in different trisectors and so handled by different BTSs.

Figure 4:
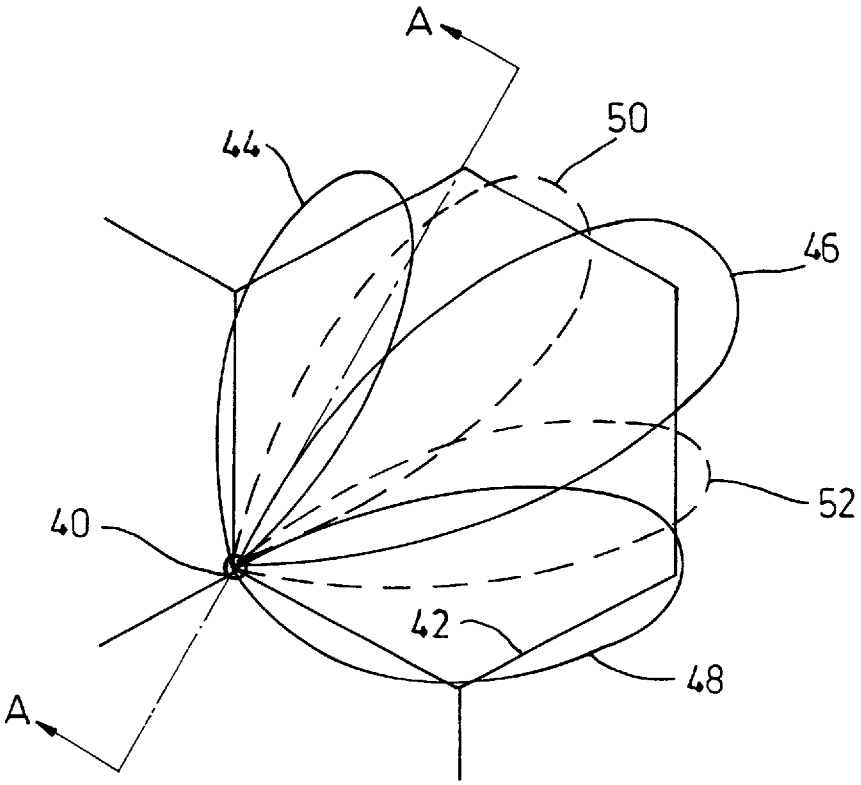
FIG. 4 is a schematic plan view of the footprints of the uplink and downlink beams of a 120° portion of a TC9S cell.

FIG. 4 illustrates schematically the coverage areas, or footprints, of the beams from one BTS 40 covering one 120° trisector 42 in a TC9S cell.

Each Nortel IS-95 BTS has three outputs and six inputs. On the downlink, each BTS in a TC9S cell generates three main beams, each covering a 40° sector of the trisector.

The three main beams 44, 46, 48 are also used on the uplink, using three of the six BTS inputs.

As a result of factors well-known to the skilled man, the footprints of the main beams 44, 46, 48 overlap to provide coverage throughout the trisector 42, and the intensity, or gain, of each beam varies throughout its footprint, particularly towards its edges.

Figure 5:
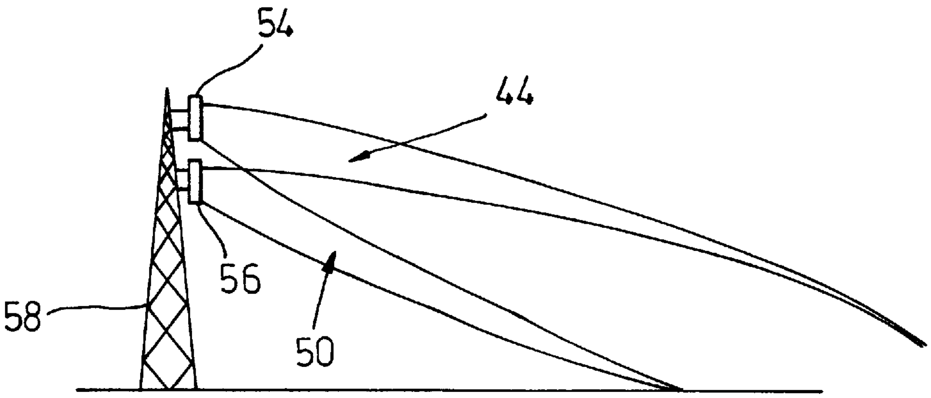
FIG. 5 is a schematic view in elevation of two of the beams of FIG. 4, sectioned on A—A in FIG. 4.

The main beams may be generated by three separate antennas or antenna facets or by one phased-array antenna facet 54 driven in known manner. The phased-array antenna 54 in FIG. 4 is mounted on an antenna mast 58, as shown in FIG. 5.

In a TC9S cell, three uplink diversity beams are also generated, having similar footprints to the main beams described above. However, to modify a TC9S cell according to the embodiments of the invention described below, one BTS input is required to handle a downward-looking antenna (DLA) leaving only two remaining inputs, which are used to generate two uplink diversity beams 50, 52. The diversity beams may be generated by two antennas or by one phased-array antenna facet 56 as shown in FIG. 5. The diversity antenna is spaced from the main antenna, preferably by about 3 metres, to ensure uncorrelated uplink fading (spatial diversity) between the main and diversity beams. (The main antenna is shown above the diversity antenna in FIG. 4 for clarity, but these antennas would normally be horizontally spaced in practice).

The two diversity uplink beams 50, 52, are designed to cover the 120° trisector 42 in two 60° sectors, interleaved with the main beams 44, 46, 48, so as to fill in any cusps between the footprints of the main beams in which the gain of the main beams may be relatively low.

The main and diversity beams each cover a much smaller angle in elevation than in azimuth. The elevation coverage angle is typically only a few degrees (for example 5°–6°), as shown schematically in FIG. 5 which shows a vertical section along the line A—A through two beams 44, 50 shown in FIG. 4. The low elevation angle ensures adequate beam gain at long ranges, at the edge of the cell, but leaves an area of low beam gain near the antenna mast.

The main antenna facet and the diversity antenna facet are preferably constructed as similar phased arrays for ease of manufacture. The different beam patterns are then generated by different antenna element phasing arrangements. In addition, the main and diversity antennas may comprise a single manufacturable unit for ease of installation in the field.

As an alternative, polarisation diversity could be used instead of the spatial diversity arrangement described above.

A Nortel IS-95 BTS which has allocated a forward (downlink) channel on any of its three 60° sectors will search for mobile station uplink signals on all of its antenna inputs, which cover the full 120° trisector covered by the BTS. This means that if a BTS has a downlink to a mobile station in any sector, the uplink is effectively always in softer handoff to all three sectors.

Sidelobes and Backlobes

One difficulty in the design of an antenna for generating the main and diversity beams is the control of beam sidelobes and backlobes. It is inevitable that sidelobes and backlobes will be generated as well as the main beams, due to the limitations of antenna design when a wide-aperture antenna must generate a narrow-beamwidth antenna radiation pattern. Lobes may also be caused by local beam scattering.

Normally, sidelobes and backlobes are of much lower intensity than the main beam generated by an antenna, but they also point in different directions. Specifically, a problem arises if the footprint of a sidelobe or backlobe falls near the antenna in a region beneath the main beam. The main beam has low gain near the antenna because of its low angle of coverage in elevation and so, in this region, the gain of sidelobes and backlobes may be greater than that of the main beam.

A sidelobe or backlobe may occur in the same trisector as the corresponding main beam, as an in-trisector (IT) lobe, or in another trisector, handled by a different BTS, as an out-of-trisector (OOT) lobe.

OOT lobes are of particular concern in TC9S cells because of the problem of a mobile station moving into an OOT lobe during a telephone call. If the mobile station is near the antenna (close-in), the gain of the main beams will be low. The mobile station will therefore be transmitting at high power. If it then moves into an OOT lobe of relatively high gain, the BTS handling that OOT lobe will suddenly receive a high power CDMA transmission which it did not expect and which it cannot power-control. Other communications on that BTS may thus be swamped until the BTS can power control the mobile station, which cannot occur until the mobile station detects the pilot signal from the BTS and sets up a soft handoff involving two-way communication between the mobile station and the BTS. This process may take a significant length of time. First, a pilot signal must be detected, but even after a pilot signal has been detected, setting up a soft handoff may take hundreds of milliseconds.

IT lobes are less of a problem in TC9S because an IT lobe is handled by the same BTS as the main beams in the same trisector. A mobile station may still move from a low gain area of a main beam into a higher gain IT lobe, but the IS-95 BTS is aware that the mobile station is in its 120° trisector and continuously monitors all its antenna inputs for powerful new signals from that mobile station. To do this it uses a fast searcher of a single cellsite modem (CSM) rake device. The mobile station is effectively in a condition of softer handoff with all of the uplink beams of the BTS at all times, so the BTS can detect rapid increases in signal power from the mobile station, for example if it moves into an IT lobe, and power-control it very rapidly.

Similar problems may arise in cell types other than TC9S. For example, in a sectored cell in which each sector is handled by a different BTS, a mobile station close-in to the cell site in a first sector may cause uplink interference in a BTS handling a second sector if it moves into a sidelobe or backlobe of the antenna of the second sector which has a footprint within the first sector. Such a sidelobe or backlobe may be termed an out-of-sector (OOS) lobe. The problem of OOS lobes will not be discussed in detail herein but is analogous to the problem of OOT lobes in TC9S cells. The description of OOT lobes in TC9S cells should therefore be considered to encompass OOS lobes as described above.

In a sectored cell in which each sector is handled by a different BTS, "in sector" lobes may exist but do not lead to uplink interference problems.

A similar problem may arise even if antenna sidelobes or backlobes are not involved. If a mobile station is close-in and moving, then it may have a very high angular velocity around the centre of the cell. As a result it may move rapidly into a new trisector before a hand-off can be set up, and in the worst case it may block out other calls to the BTS of that new trisector by transmitting at too high signal strength until the handover is established or the call dropped.

In addition, in the TC9S system, because each BTS only has a 120° coverage region, it is possible for the mobile station to get close to a BTS (for example by entering the BTS's coverage area from behind) before the BTS has any knowledge of its existence. By contrast, in a cell in which one BTS has omni-coverage, such as in TC3S, soft hand-offs will only occur at cell boundaries, which are at a considerable distance from the BTS.

The Downward-Looking Antenna

A downward-looking antenna (DLA) embodying the invention is an antenna situated at a cell-site which produces a beam having a lower angle of elevation than the main beams (including any diversity beams) of the cell site. The DLA beam footprint therefore lies near the cell site, where the gain of the main beams may be low. The coverage of the DLA in azimuth advantageously matches the azimuthal coverage of the BTS to which it is connected. This will depend on the cell type but may cover, for example, a sector or a trisector. The purpose of the DLA is to ensure that wherever a mobile station is positioned within a BTS's coverage region, it will always have a higher-gain uplink to that BTS than to any other BTS. For example, in a trisector of a TC9S cell handled by a first BTS this means that the gain of the DLA beam is advantageously greater than that of any OOT lobes of other BTSs falling within that trisector.

Depending on cell type, the DLA may also advantageously have a higher gain than that of any OOT or IT lobes. This may apply, for example, in a cell in which adjacent sectors are handled by the same BTS but in which the uplink from a mobile station is not always in softer handoff to all the sectors.

In a sectored cell in which each sector is handled by a different BTS, the DLA advantageously has a higher gain than that of any OOS lobe(s) in each sector.

Uplink interference is usually only an issue for mobile stations which are close to the BTS, where strong OOT or (OOS)lobes from adjacent sectors or trisectors may be present, and where the antenna patterns may be affected by local scatterers, such as the antenna tower. In the majority of the coverage area, the main beams provide the strongest uplink path back to their own cell site. For the close-in region the DLA advantageously provides this strongest uplink path.

Using the DLA, a mobile station preferably cannot have a stronger path to an adjacent sector's BTS than it does to its own. This means that the power control performed within the sector or trisector can advantageously be sufficient to prevent adjacent sectors from being swamped.

DLA Implementation in a TC9S cell

The TC9S cell design is not tied to any specific main beam or diversity beam elevation beamwidth or antenna gain. Therefore, if a TC9S cell is to be used in a high-capacity, low-cell-area coverage environment, such as in a city, antenna facets of a predetermined height may be used to provide a wide elevation beamwidth (say 6°–8°) and correspondingly small peak gain. By contrast, in a low-capacity, larger-cell-area coverage environment, taller antenna facets may be used to provide a narrower elevation beamwidth (say 4°–6°) and higher peak gain. The DLA covers the close-in area beneath the main and diversity beams, and so its area of coverage varies depending on the coverage of the main and diversity beams.

The DLA specification is also very closely tied to other specifications of the main and diversity beams. Thus if it is required to relax the specification of the main/diversity beams, say for example increasing the peak allowed OOT lobes, then this is acceptable if the DLA gain is increased commensurately to compensate. The DLA specification must therefore be couched in terms of the main and diversity beam specifications, in order to give the antenna designer the maximum freedom in trading off main/diversity antenna and DLA performance.

By way of example, tables 1, 2 and 3 set out proposed specifications for examples of main beam, diversity beam and corresponding DLA antenna facets according to a first embodiment of the invention.

TABLE 1

| Main Beam Antenna Facet Specification | |
|---|---|
| Frequency band | 1900 MHz |
| Maximum facet height | 1.8 m |
| Maximum facet width | 40 cm |
| Number of beams | 3 |
| Main B = beam peak gain | 21 dBi |
| Main beam azimuthal 3 dB beamwidth | 29 degrees |
| Main beam 1st sidelobes relative to peak gain | <–16 dB (<5dBi) |
| Side beam peak gain | 19 dBi |
| Side beam bearing for peak gain | +/–30 degrees |
| Side beam azimuthal 3 dB beamwidth | 34 degrees |
| Side beam 1st in-trisector (IT) sidelobes gain relative to side beam peak gain | <–16 dB (<3dBi) |
| All main beams' elevation 3 dB beamwidth | about 5 degrees |
| Mean backlobe gain relative | –30 dB (see Note 1) |

TABLE 1-continued

| Main Beam Antenna Facet Specification | |
|---|---|
| to main beam peak gain | |
| All OOT lobes' gain for elevation angles more than 10 degrees below horizon | <0 dBi (see Note 2) |

Notes to Table 1

1. This is a requirement which may be relaxed by a certain amount if necessary, say to −20 dB, but with a slight impact on system capacity (of perhaps a few percent).
2. This requirement is tightly linked to the DLA specification (see below), and may be relaxed if the DLA performance can be improved.

The figures in Table 1 have been chosen in order that the set of three main beams will provide a close match to a hexagonal footprint (for an assumed 35 dB/decade propagation law), giving main beam gains relative to boresight of −2 dB at 30 degrees offset, and −10.5 dB at 60 degrees offset.

TABLE 2

| Diversity Beam Antenna Facet Specification | |
|---|---|
| Frequency band | 1900 MHz |
| Maximum facet height | 1.8 m |
| Maximum facet width | 40 cm |
| Number of beams | 2 |
| Peak gain | 20 dBi |
| Bearing of beam peak gain | +/−16 degrees |
| Azimuthal 3 dB beamwidth | ~30 degrees |
| 1st sidelobes relative to peak gain | Not Critical (See Note 3) |
| All beams' elevation 3 dB beamwidth | about 5 degrees |
| Mean backlobe gain relative to main beam peak gain | −30 dB (see Note 1) |
| All OOT lobes' gain for elevation angles more than 10 degrees below horizon | <0 dBi (see Note 2) |

Notes to Table 2

1. This is a requirement which may be relaxed by a certain amount if necessary, say to −20 dB, but with a slight impact on system capacity (of perhaps a few percent).
2. This requirement is tightly linked to the DLA specification (see below), and may be relaxed if the DLA performance can be improved.
3. Since the diversity facet is not used on the downlink, the requirement for IT lobes set out in Table 1 for the main beam facet does not apply to the diversity facet.

The diversity facet is advantageously of similar construction to the main facet. For cost-effectiveness it is desirable to make both facets using a single fabrication process with perhaps a different option for the antenna phasing arrangement, preferably during deployment.

TABLE 3

| DLA Specification | |
|---|---|
| Frequency Band | 1900 MHZ |
| Nominal beain trisector width in azimuth (−3 dB) | 120° |
| In-Trisector (IT) gain for all elevation angles more than 10° below horizon | >Sidelobes'/backlobes' gain of all beams from main and diversity facets of adjacent sectors (i.e. >0 dBi). |
| Maximum Out-Of-Trisector gain for all elevation angles more than 10° below horizon. | <Minimum In-Trisector gain of adjacent trisector DLAs for all elevation angles more than 10° below horizon. |

For a theoretical constant-gain DLA implementation (constant-gain across the DLA's footprint), geometric considerations suggest that the minimum theoretical gain achievable for the DLA is about 8.8 dBi. In order to meet the in-trisector gain requirement, using a constant-gain assumption, the maximum gain for the OOT lobes of the main beams is thus 8.8 dBi. The specified level of 0 dBi in Tables 1 and 2 has been chosen to allow for implementation considerations in the DLA (for example gain roll-offs at trisector edges). Simple system considerations suggest that the gain of the DLA for all elevation angles outside the ones specified is not critical. For example, if the gain of the DLA is 4 dBi above 10° below horizon, which is at least 15 dB less than the main or diversity beam gains, and its azimuthal −3 dB beamwidth is some 3 times that of the main or diversity beams (or some 5 dB in logarithmic terms), then a rough estimate of interference at the DLA due to main or diversity beams or other-cell users is about −10 dB or one tenth of main or diversity beam interference. Thus, assuming no users in the primary DLA coverage area (i.e. close-in), the interference margin (Rise Above Thermal (RAT) or Interference Degradation Margin (IDM)) at the DLA is 1.1 dB, which is some 4.9 dB less than the expected RAT for the main beams. This is an extra safety margin for the DLA, and demonstrates that DLA gain in directions served by the main beams is not problematic.

In theory, a highly-advantageous beam pattern for the DLA would have a gain greater than the strongest OOT lobe by a predetermined margin, over its entire 120° azimuth, 10° to 90° below horizon elevation coverage area. This would probably allow a large margin, as the main and diversity beam sidelobes and backlobes are only anticipated to have high gain in a small number of directions. However, if these directions are not accurately predictable then a substantially constant-gain DLA implementation is required.

DLA Implementation

Figure 6:
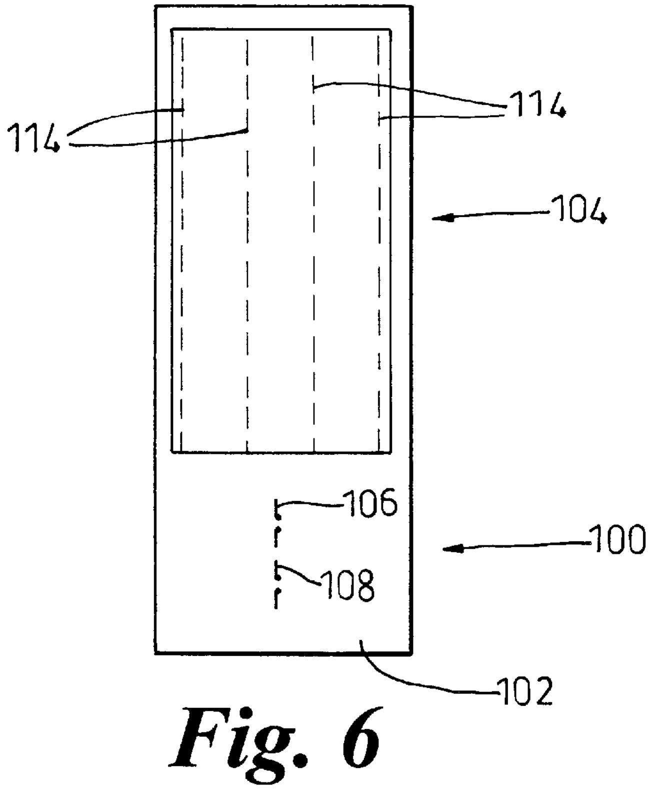
FIG. 6 is a front view of a combined main-beam and DLA antenna unit according to a second embodiment of the invention.

A DLA according to a second embodiment of the invention is illustrated in FIGS. 6 (front view) and 7 (side view). The DLA 100 is mounted on the lower portion of a metal ground plane 102 which carries on its upper portion an antenna 104 for generating the main beams of a trisector. The DLA 100 comprises a pair of vertical dipoles 106, 108 stacked vertically ½ wavelength apart and spaced from the ground plane by supports 110. The dipoles are fed with signals phased by 135° from each other to tilt the direction of peak gain of the DLA beam downwards. The DLA beam pattern 112 is indicated schematically in FIG. 7.

For isotropic elements a 90° phasing would be appropriate to tilt the direction of peak gain of the DLA beam by 30° but about 135° phasing is required when the dipole element pattern is taken into account.

The main-beam antenna 104 is conventional, and comprises four high-gain antenna columns 114 supported on the ground plane. The main beam pattern 116 is indicated schematically in FIG. 7, together with several elevation sidelobes 118.

The DLA and the main-beam antenna are covered by a radome 120 (not shown in FIG. 6).

Figure 8:
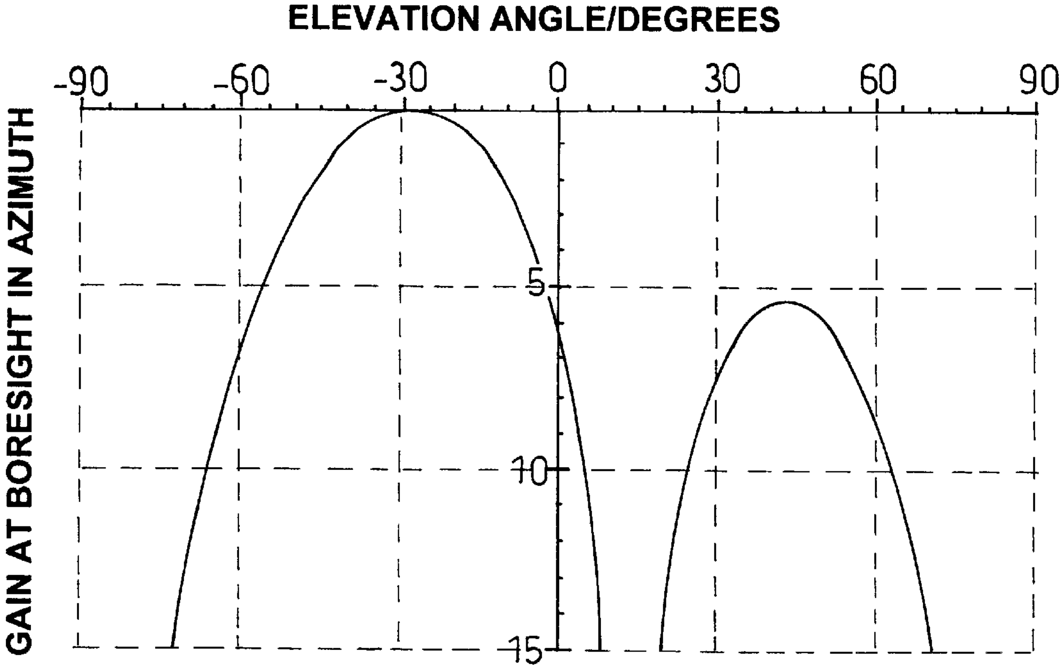
FIG. 8 is a plot of beam gain at boresight in azimuth vs. elevation angle for the DLA of FIGS. 6 and 7.
Figure 9:
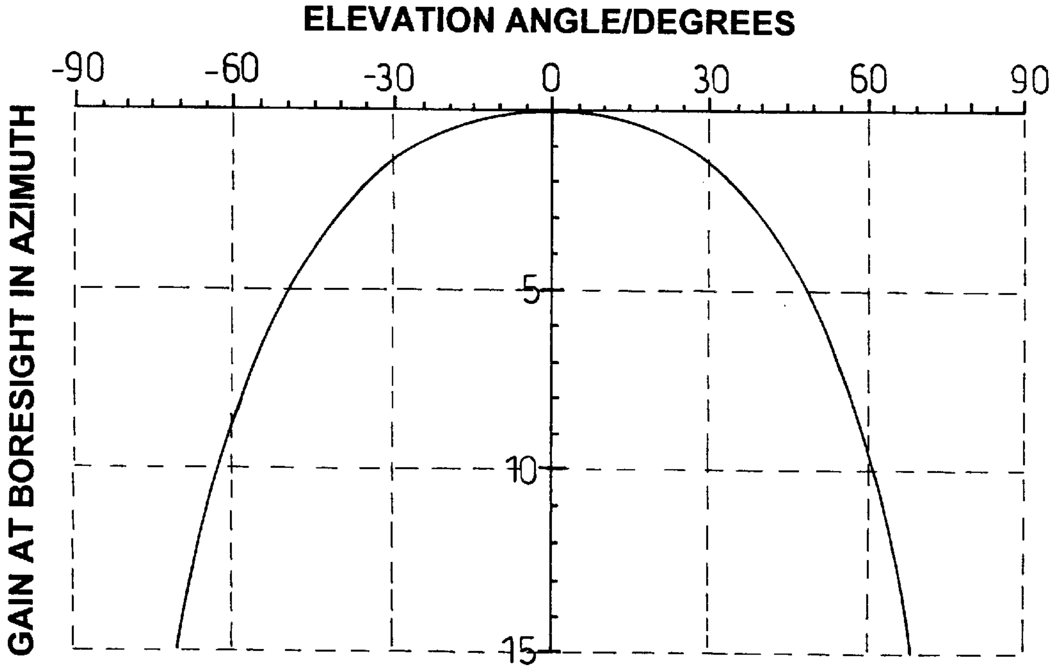
FIG. 9 is a plot of beam gain at boresight in azimuth vs. elevation angle for a single dipole antenna with an infinite ground plane.

The DLA 100 has been modelled using LINPLAN (LINear PLANar, a modelling tool which assumes an infinite ground plane), and the DLA gain pattern in elevation is shown in FIG. 8. The directivity is 9.5 dBi (so if the antenna is efficient, the gain will be almost equal to this figure), and the direction of peak gain is tilted down by 30° (taking into account also the dipole element pattern). The azimuthal 3 dB beamwidth is 120°, giving full-trisector coverage in azimuth. A DLA gain of greater than 4 dBi is maintained for all angles between about 5° and 55° below horizontal (but it should be noted that this is for boresight in azimuth, and at the trisector edges the azimuth pattern will be about 3 dB down). For greater downward elevation angles the DLA gain falls off rapidly. This is due to the element shaping of the individual dipoles (set above a ground plane). To illustrate this effect, FIG. 9 shows the elevation gain pattern of a single dipole with a reflector (i.e. an infinite ground plane). This has a directivity of 7.2 dBi, but for any elevation angles of the order of 60° below horizontal it can be seen that the gain falls off rapidly.

This fall-off in DLA gain at large elevation angles is unlikely to cause a problem for the following reason. For an antenna mast of, e.g., 30 m in height, the fall-off in gain would only imply a loss of DLA coverage for mobiles up to about 17 m from the foot of the mast. This would only ever become an issue for deployments such as, for example, where a TC9S mast is sited very near the edge of a busy highway.

Another reason that the fall-off of DLA gain for large downward elevation angles may not be a serious problem is that a similar characteristic would be expected for the (elevation) sidelobes and backlobes of a main beam antenna, including OOT lobes.

One mechanism for a faceted antenna to generate backlobes is that the edge of the finite ground plane becomes excited by the outermost antenna columns, exciting secondary currents. These currents cause radiation backwards from the facet. A typical level of peak backlobe radiation from a facet would be of the order of −10 dBi, and this would occur in the horizontal plane. Just as in the forward plane it is expected that for greater elevation angles the backlobe peak radiation would be less, due to the array factor effects (the induced currents along the vertical facet edges also form a vertical array), perhaps by more than 30 dB (i.e. down to about −40 dBi). This is much lower than the DLA gain, so that the DLA should provide adequate coverage.

The other significant mechanism for generating backlobes is backscatter from nearby reflectors sited in one of the main beams. This is an effect which can neither be measured in an antenna chamber, nor eliminated by careful antenna design. Thus, it is in principle possible that a mobile sited close to the foot of the antenna tower is both outside the coverage of the DLA (because the DLA gain falls off in the downwards direction) and also inside the coverage of a strong reflection from an adjacent-trisector main beam. However, this is expected to be very rare, and could easily be eliminated by careful placement of the antenna tower away from the verge of a busy highway, and away from (and above) large, close-in scatterers.

Figure 10:
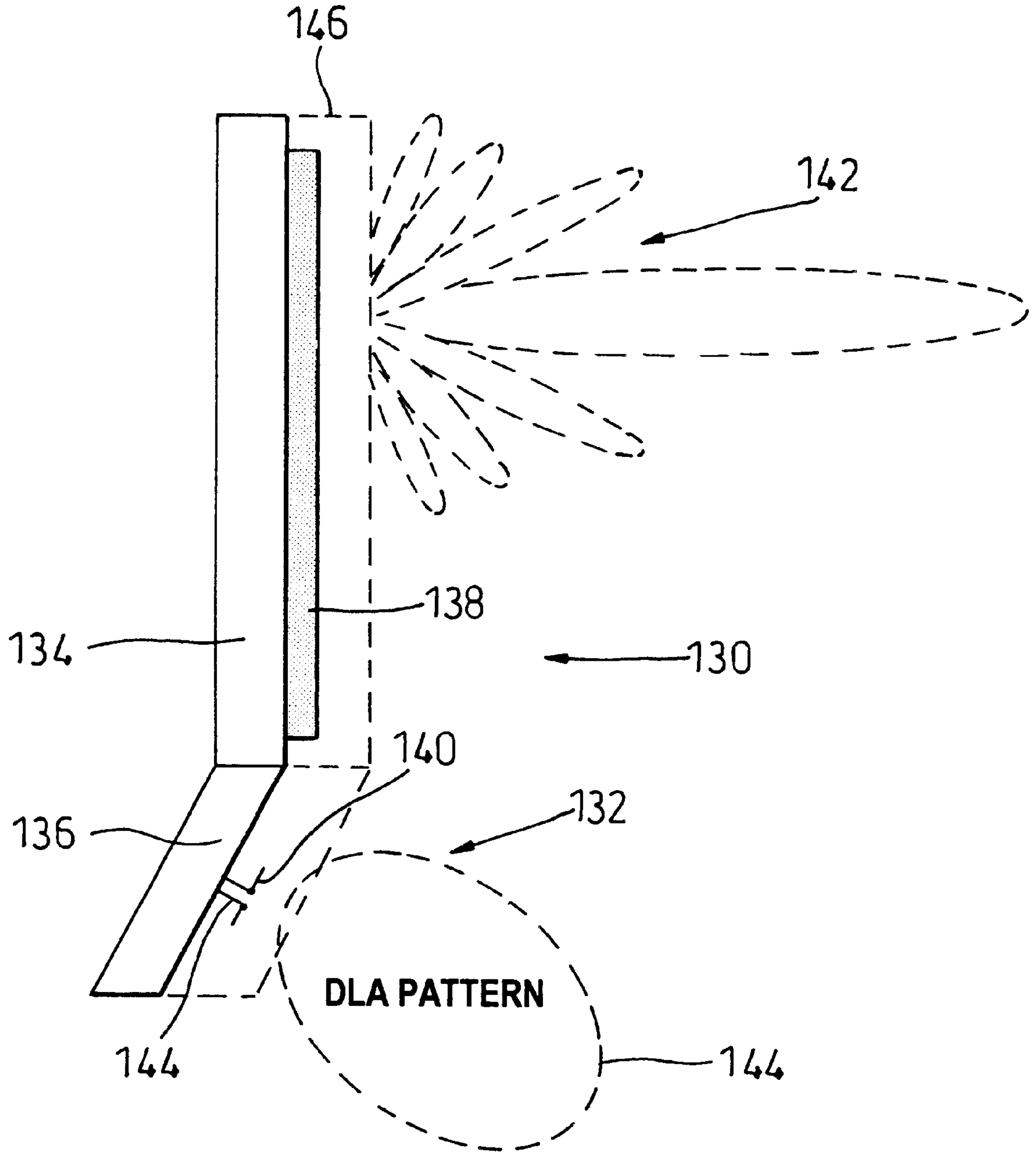
FIG. 10 is a side view of a combined main-beam and DLA antenna unit according to a third embodiment of the invention.

FIG. 10 is a side-view of an antenna facet 130 comprising a DLA 132 according to a third embodiment of the invention. This antenna facet is similar to that of the second embodiment except that the DLA is mechanically tilted downwards. The antenna facet comprises a metal ground plane having an upper portion 134 on which a conventional main beam antenna 136 is mounted and a lower portion 138 on which a single vertical dipole 140 is mounted to form the DLA. In use, the upper portion of the ground plane is positioned in conventional manner to produce the required angle of elevation of the main beam 142 (shown schematically in FIG. 11); the angle of elevation of the main beam may be achieved mechanically by inclining the upper portion of the ground plane or electrically by controlling the signals to the main beam antenna, or by a combination of these techniques, in conventional manner. However, the lower portion of the ground plane is angled backwards at about 40° to the upper portion. The simple DLA dipole 140, spaced from the ground plane by a support 144, thus generates a DLA beam 144 with an elevation of about 40° below horizontal. The precise angle may also be adjusted electrically by controlling signals to the DLA.

The antenna is housed in a radome 146. Ignoring the effect of the antenna tower (which in practice can only be done if the antenna facet is mounted away from the tower), FIG. 9 (which shows the elevation gain for a simple dipole) shows that a DLA with a mechanical downtilt of about 40° maintains >4 dBi for all elevation angles down to about 80° from horizontal (at 0° azimuth), and more than about 2 dBi straight down. This may therefore be a preferred DLA implementation compared to that of the first embodiment in terms of antenna pattern. However, the main disadvantage is that the arrangement of the second embodiment would be more difficult and expensive to manufacture and install.

The angle of the lower portion 138 of the ground plane may be positioned during manufacture at any desired angle to optimise DLA performance. As mentioned above, the DLA specification may vary if the main beam antenna specification varies, and this may require different ground plane angles to the angle of 40° illustrated above.

In addition, features of the DLAs of the second and third embodiments may advantageously be combined, in that a pair of dipoles may be mounted on an inclined or tilted ground plane portion.

Operation of the DLA

The purpose of the DLA is to ensure that wherever a mobile station is within a BTS's coverage region (e.g. a trisector), it should always have a stronger path to that BTS than to the adjacent BTSs. This is usually only an issue for mobile stations which are close to the BTS, in the region where strong OOT lobes from adjacent trisectors may be present, and where the antenna patterns may be affected by local scatterers, such as the antenna tower. In the majority of the coverage area, the main beams provide the strongest path back to their own base. For the close-in region, the DLA provides this path.

Using this antenna, we know that a mobile station should not have a stronger path to an adjacent trisector's BTS than it does to its own. This means that the power control performed within the trisector should advantageously be sufficient to prevent adjacent trisectors from being swamped. Advantageously, only the BTS handling the call with the MS needs to be involved in power control of the mobile station.

According to the invention, the DLA may be operated in more than one way.

In a first method of operating the DLA, the DLA is coupled to an input of the BTS, to which no software changes are made. The DLA is therefore handled in the same way as the other five uplink channels (in TC9S), as described above. This enables the power control system of the BTS to prevent uplink interference to another BTS if a mobile station enters an OOT lobe of the other BTS, as follows.

If the mobile station is close-in in the trisector of a first BTS, then it may enter an OOT lobe of a second BTS. The second BTS will then receive an uplink signal from the mobile station which will appear as noise because the second BTS does not have a communication channel with the mobile station. However, the mobile station is also within the DLA beam of the first BTS, and the gain of the DLA beam is greater than that of the OOT lobe. The first BTS does have a communication channel with the mobile station and can therefore control its power to a level appropriate to the DLA beam gain. A rather less powerful signal will therefore be received by the second BTS via the relatively low gain OOT lobe. The mobile station is still a source of noise to the second BTS but the DLA prevents it from being a significant source of noise, and from swamping the second BTS.

In a second method of operating the DLA, the BTS handles signals from the DLA differently from the other uplink beams. This requires software changes to the BTS. In this method, the BTS search algorithm is changed to perform searches on the DLA with higher priority than the other antennas, but with a shorter search window. This is possible because MSs must be at short range (close-in) to be in the DLA coverage region. Higher priority searches will advantageously allow signal components picked up through the DLA to be rapidly discovered, whilst the short search window will prevent excessive loading on the searcher.

In either method, it will be appreciated that the DLA may advantageously be implemented in an existing cell with minor hardware changes (the provision of the DLA itself) and little or no software changes.

Other Effects of the DLA

Figure 11:
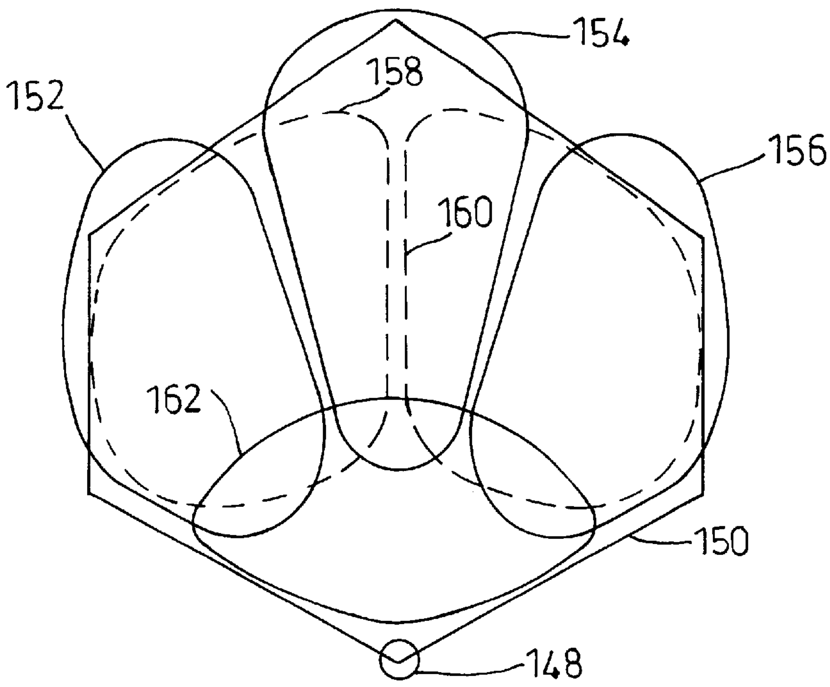
FIG. 11 is a schematic plan view of the footprints of the beams in a trisector of a TC9S cell modified to incorporate a DLA according to an embodiment of the invention.
Figure 12:
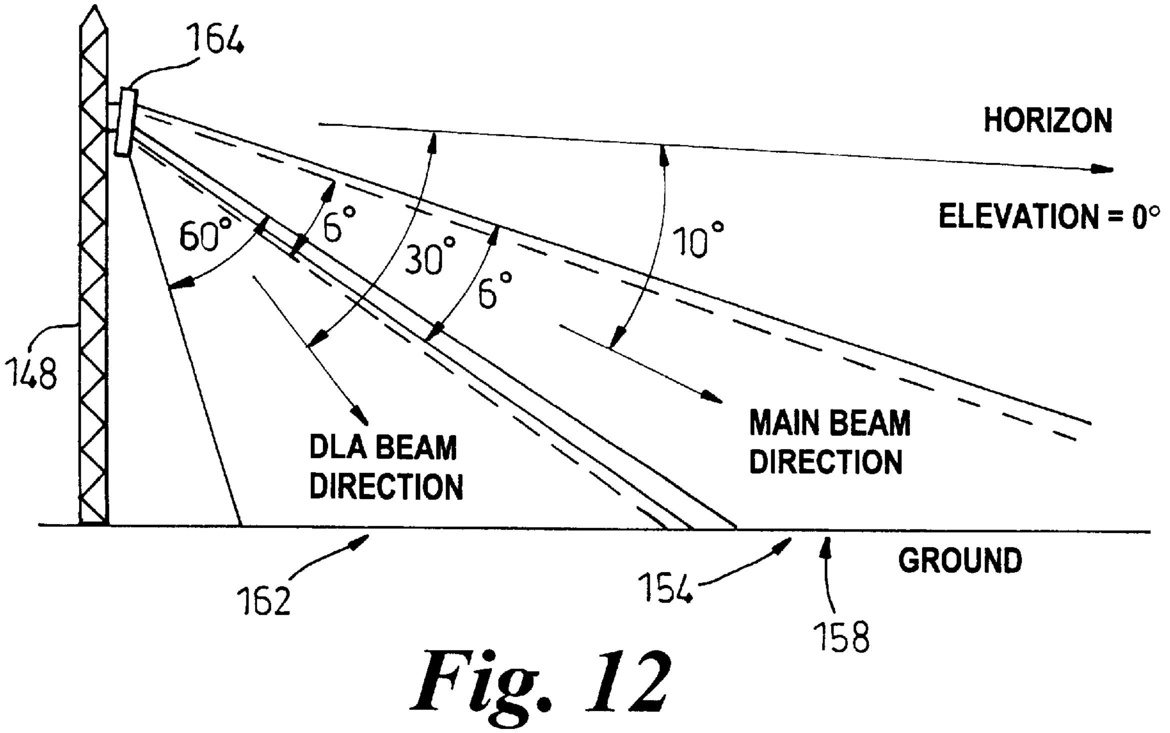
FIG. 12 is a schematic view in elevation of the trisector of FIG. 11.

Using an antenna array incorporating a DLA in TC9S introduces a significant difference in the beam footprints between the uplink and downlink beams. FIGS. 11 and 12 illustrate schematically the beam footprints and elevations respectively. Similar changes may occur in other cell types.

FIG. 11 shows the position of a cell-site antenna mast 148 and the approximate portions of a hexagonal trisector 150 covered by the three main uplink and downlink beams 152, 154, 156, the two diversity uplink beams 158, 160 and, closer to the antenna mast, the DLA uplink beam 162. FIG. 12 shows a side view of the antenna mast 148 and antenna 164 (the main and diversity antennas and the DLA are shown as a single antenna for simplicity) and the elevation of one main beam 154, one uplink diversity beam 158 and the DLA beam 162. FIG. 12 also indicates typical angles of elevation and elevation coverage for each beam. These angles may vary according to a number of factors, as described above.

Several effects are caused because the diversity uplink beams have different footprints to the man beams, which may require modifications to the BTS. One is the possibility of producing inaccurate power estimates on the uplink. Normally, in a cell where the main and diversity uplink beams covering a sector coincide, the sector uplink power is estimated by estimating the power received by each sector's main and diversity antennas, and selecting the greater of the two estimates within the sector. In the TC9S system, when the DLA is introduced the diversity beams do not correspond to the main beams in the same way, and these estimates will be incorrect. In addition, the main beam whose diversity input at the BTS is being used for the DLA will produce particularly poor estimates. These estimates are normally used to control cell-breathing, and for certain other purposes.

There are several approaches that advantageously improve this power estimate in the modified TC9S cell.

First, the power-estimation algorithm may estimate the uplink power using only the main antenna inputs, and not the diversity antennas, i.e. it may use only the three main antenna inputs. Because power estimation in each sector will then only be based upon a single antenna output, the estimate-filtering parameters should be adjusted to improve the quality of the estimate.

Alternatively, the power-estimation algorithm may be changed so that powers of antenna inputs are combined using a weighting which depends upon the degree of overlap between the beams. This is more complex than the first method described above, but may improve the accuracy of the uplink-power estimates.

Third, cell breathing may be disabled. This would only be effective for the purposes of cell breathing. Other aspects of the system requiring power estimates would still require one of the methods described above.

If, as in the TC9S system, the main beams are used for both downlinks and uplinks, there is likely to be an uplink path with similar mean pathloss to the downlink. However, because the additional uplink beams (the DLA beam and the diversity beams) have different footprints, they may have significantly different path losses to the main beams. Considering all beams, the overall uplink is unlikely to have significantly worse pathloss than the downlink, but it could be substantially better. (Note: In this discussion, the term "pathloss", is understood to include the gains of the antennas).

The uplink power-control algorithm is normally based upon the assumption that the downlinks and uplinks have the same average pathloss, an assumption which no longer holds if the downlink and uplink beam patterns differ.

Open-loop uplink power-control causes each MS to adjust its transmit power in the opposite direction and by the same amount as changes in the downlink power it receives.

If the downlinks and uplinks have identical path loss then this strategy ensures that the uplink signal power received at the BTS remains constant. (In practice, there will be some imbalance between downlink and uplink paths, and the closed-loop power control is used to continually adjust a correction offset which is applied to the MS transmitter power).

Referring to FIG. 11, in the TC9S system a mobile station moving between downlink main beams 152 and 154 will see an overall reduction in received pilot power due to cusping of the downlink beams, and will thus increase its transmit power due to the open-loop control. At the same point, the interleaved uplink beam 162 will be at its strongest, meaning that mobile station transmit power could actually be reduced. The closed-loop power control will attempt to correct for this imbalance, but overall power control performance is likely to be degraded. For mobile stations which are in the DLA coverage area, the same effect will occur, but will be more extreme because the uplink through the DLA is likely to be much stronger than the downlink via the main beams.

An extra complication is that in the IS9S system specification a typical mobile station is only guaranteed to have a closed-loop adjustment range of +/−24 dB around the open-loop estimate. If the imbalance between the downlinks and uplink is greater than this then the mobile station may not be able to reduce its transmitter power sufficiently, even if ordered to by the BTS.

If the mismatch in the uplink and downlink pathloss is less than this 24 dB limit then there will not be a significant problem although it is important that uplink closed-loop power control responds sufficiently rapidly.

Similarly, for mobile stations which exceed this minimum specification, the problem will be less likely to occur.

Because the mobile station cannot easily be changed, the only software approach to improving performance without making major changes to the power-control system is to reduce the open-loop reference set point. If a mobile station cannot increase its transmit power sufficiently then its call will eventually be dropped. If it cannot reduce its power sufficiently then it can cause many other calls to be dropped. It is thus more important to ensure that the mobile station can reduce its power than increase it. Reducing the open-loop power estimate has the effect of offsetting the range of possible transmit powers so as to allow a greater reduction than increase in power about the mean required value.

The difference in pathloss between downlink and uplink is likely to be most extreme for mobile stations which are in the DLA coverage region, and so this is the region where the limited closed-loop correction range is most likely to cause difficulties. If the DLA is also used as a transmit antenna on the downlink then this will put a lower limit on the signal strength that the mobile station will receive, which will in turn help reduce the mobile station transmit power. However, using the DLA as a transmit antenna may require additional hardware (depending on the cell type).

A further option is to transmit white noise from the DLA. The open-loop power control in the mobile station uses as a crude estimate of pilot power a measure of the total received energy (from all sources) at the mobile station antenna. Because of this, a DLA transmitting white noise on the downlink would cause the mobile station to think that the pilot was strong, for the purposes of open-loop power control estimation, and would cause it to reduce its open-loop transmit power estimate. The amount of power to be transmitted as white noise would have to be carefully balanced so that it does not cause mobile station open-loop estimates to be so low that calls will be dropped. The mobile station uses more accurate pilot strength estimates when it sends a Pilot Strength Measurement message. The reason that the crude power measurement is used in the open-loop estimation rather than the more accurate measurements is simply that the total power estimate can be made more rapidly. This allows the power control to respond rapidly to sudden changes in pathloss, such as is caused by shadowing behind buildings.

Alternatively, all three downlink pilot channels in a TC9S trisector could be combined together, and transmitted as a composite signal on the DLA. This would have the benefit that the mobile stations may be able to detect useable signal components from the DLA transmission. These components will have reduced SNIR compared to those from the main beams because all three downlink carriers will be combined into a single transmission and will cause self-interference to each other. This option would require significantly more complex hardware.

Although the invention has been illustrated herein principally with reference to the TC9S cell type, as has been indicated earlier it may be advantageously applied to a wide range of sectored cell-types and its use is therefore not limited in any way to TC9S cells.

What is claimed is:

1. An antenna for a sectored cell of a cellular radio communications system, being a third antenna of said cell, in which said cell has a cell site comprising;

a first antenna for generating a first principal beam for radio communication to and/or from subscriber units located in a first sector of said cell; and a second antenna for generating a second principal beam for radio communication to and/or from subscriber units located in a second sector of said cell, said second principal beam having a sidelobe or backlobe which has a beam gain and falls within said first sector below a predetermined angle of elevation;

in which said third antenna is a downward-looking antenna (DLA) located at said cell site, for generating a DLA beam having coverage in azimuth corresponding to said first sector, coverage in elevation substantially below said predetermined angle of elevation, and a beam gain greater than said beam gain of said sidelobe or backlobe;

and in which said third antenna enables power control of radio transmissions from subscriber units communicating with said first antenna and positioned within said DLA coverage area.

2. An antenna according to claim 1, in which said predetermined angle of elevation is between 10° and 20° below horizon.

3. An antenna according to claim 1, in which said DLA beam has its peak gain at an angle of elevation of between 25° and 60° below horizon.

4. An antenna according to claim 1, in which said DLA beam has coverage in elevation from said predetermined angle of elevation to between 70° and 90° below horizon.

5. An antenna according to claim 1, in which said DLA generates only an uplink beam, for receiving radio transmissions from subscriber units.

6. An antenna according to claim 1, in which said DLA transmits noise at a predetermined power for use by a subscriber unit for open-loop power control.

7. An antenna according to claim 1, in which said DLA and said first antenna are fabricated as parts of a single antenna unit.

8. An antenna according to claim 7, in which said single antenna unit comprises;

a ground plane;

a principal-beam antenna mounted at an upper portion of said ground plane; and a DLA mounted at a lower portion of said ground plane.

9. An antenna according to claim 8, in which said lower portion of said ground plane is at an angle to said upper portion so that said principal beam and said DLA beam have different angles of coverage in elevation.

10. An antenna according to claim 8, in which said DLA comprises a plurality of antenna elements, and in which signal phasing between said antenna elements generates a downward-tilted DLA beam.

11. An antenna according to claim 1, in which said first antenna generates, or is one of a first plurality of antennas which generates, a plurality of principal beams covering a corresponding plurality of adjacent sectors, and said DLA has coverage in azimuth corresponding to said plurality of adjacent sectors.

12. An antenna according to claim 1, for transmitting and/or receiving radio communications to and/or from subscriber units using code division multiple access (CDMA) radio communication.

13. A cell site for a sectored cell of a cellular radio communications system, comprising;

a plurality of base transceiver stations (BTSs), each for handling radio communications with subscriber units in a respective corresponding sector or group of sectors of said cell;

a principal-beam antenna coupled to each BTS; and a downward-looking antenna (DLA) coupled to a first one of said plurality of BTSs, being said BTS for handling communications in a corresponding first sector or group of sectors of said cell via a first of said principal-beam antennas;

in which said first principal-beam antenna generates a first principal beam covering said first sector or group of sectors;

in which one or more of said principal-beam antennas, other than said first principal-beam antenna, generates a principal beam having a sidelobe or backlobe which has a beam gain and falls within said first sector or group of sectors below a predetermined angle of elevation; and in which said DLA generates a DLA beam having coverage in azimuth corresponding to said first sector or group of sectors, coverage in elevation below said predetermined angle of elevation and a beam gain greater than said beam gain of said sidelobe or backlobe, and operates to enable power control of radio transmissions from subscriber units communicating via said first principal beam and positioned within said DLA beam.

14. A cell site according to claim 13, in which said DLA beam provides to a subscriber unit within its coverage area an uplink to said first BTS which has higher gain than any communications link to any other of said BTSs provided by any sidelobes or backlobes of any of said principal beams.

15. A cell site according to claim 13, in which a subscriber unit within said DLA beam can be power-controlled by said first BTS, so as to limit interference to other BTSs caused by subscriber unit transmissions being received by said other BTSs via said sidelobes or backlobes.

16. A cell site according to claim 13, in which each of said BTSs is coupled to a respective DLA having coverage in azimuth corresponding to said respective corresponding sector or group of sectors.

17. A cell site according to claim 13, in which said first principal-beam antenna generates, or includes a first plurality of principal-beam antennas which generates, a plurality of principal beams covering a group of sectors comprising a plurality of adjacent sectors, and said DLA has coverage in azimuth corresponding to said plurality of adjacent sectors.

18. An antenna unit for a sectored cell of a cellular radio communications system comprising, fabricated as parts of a single antenna unit;

a ground plane;

a principal-beam antenna mounted at a first portion of said ground plane; and a downward-looking antenna (DLA) mounted at a second portion of said ground plane;

such that, in use, said principal-beam antenna generates a principal beam, or a set of principal beams, having a predetermined coverage area and said DLA generates a DLA beam having a coverage in elevation overlapping a low elevation portion of said predetermined coverage area of said principal beam or set of principal beams.

19. An antenna unit according to claim 18, in which said DLA beam has a coverage in azimuth corresponding to a coverage in azimuth of said principal beam or set of principal beams.

20. A method for operating a sectored cell of a cellular radio communications system comprising;

providing first and second base transceiver stations (BTSs) respectively coupled to first and second principal-beam antennas for generating first and second principal beams for communicating with subscriber units in corresponding first and second sectors of said cell, said first principal beam having a predetermined coverage area and said second principal beam having a sidelobe or backlobe which has a beam gain and falls within said first sector in a low elevation portion of said predetermined coverage area;

providing a downward-looking antenna (DLA) coupled to said first BTS for generating a DLA beam having coverage in azimuth corresponding to said first sector, coverage in elevation in said low elevation portion of said predetermined coverage area of said first principal beam, and beam gain greater than that of said sidelobe or backlobe; and, operating said first BTS coupled to said DLA in order to control the power of transmissions from a subscriber unit in said first sector within said coverage of said subscriber unit, in order to reduce interference caused by said transmissions received by said second BTS via said sidelobe or backlobe.

21. A method according to claim 20, in which said first BTS communicates with said subscriber units via said DLA only on the uplink, downlink communications being carried via said first principal beam.

22. An antenna for a sectored cell of a cellular radio communications system, being a third antenna of said cell, in which said cell has a cell site comprising;

a first antenna for generating a first principal beam for radio communication to and/or from subscriber units located in a first sector of said cell; and a second antenna for generating a second principal beam for radio communication to and/or from subscriber units located in a second sector of said cell, said second principal beam having a sidelobe or backlobe which has a beam gain and falls within said first sector below a predetermined angle of elevation;

in which said third antenna is a downward-looking antenna (DLA) located at said cell site, for generating a DLA beam having coverage in azimuth corresponding to said first sector, coverage in elevation substantially below said predetermined angle of elevation, and a beam gain greater than said beam gain of said sidelobe or backlobe;

in which said DLA generates only an uplink beam, for receiving radio transmissions from subscriber units.

23. An antenna for a sectored cell of a cellular radio communications system, being a third antenna of said cell, in which said cell has a cell site comprising;

a first antenna for generating a first principal beam for radio communication to and/or from subscriber units located in a first sector of said cell; and a second antenna for generating a second principal beam for radio communication to and/or from subscriber units located in a second sector of said cell, said second principal beam having a sidelobe or backlobe which has a beam gain and falls within said first sector below a predetermined angle of elevation;

in which said third antenna is a downward-looking antenna (DLA) located at said cell site, for generating a DLA beam having coverage in azimuth corresponding to said first sector, coverage in elevation substantially below said predetermined angle of elevation, and a beam gain greater than said beam gain of said sidelobe or backlobe;

in which said DLA transmits noise at a predetermined power for use by a subscriber unit for open-loop power control.

24. An antenna for a sectored cell of a cellular radio communications system, being a third antenna of said cell, in which said cell has a cell site comprising;

a first antenna for generating a first principal beam for radio communication to and/or from subscriber units located in a first sector of said cell; and a second antenna for generating a second principal beam for radio communication to and/or from subscriber units located in a second sector of said cell, said second principal beam having a sidelobe or backlobe which has a beam gain and falls within said first sector below a predetermined angle of elevation;

in which said third antenna is a downward-looking antenna (DLA) located at said cell site, for generating a DLA beam having coverage in azimuth corresponding to said first sector, coverage in elevation substantially below said predetermined angle of elevation, and a beam gain greater than said beam gain of said sidelobe or backlobe;

in which said DLA and said first antenna are fabricated as parts of a single antenna unit.

25. A method for operating a sectored cell of a cellular radio communications system comprising;

providing first and second base transceiver stations (BTSs) respectively coupled to first and second principal-beam antennas for generating first and second principal beams for communicating with subscriber units in corresponding first and second sectors of said cell, said first principal beam having a predetermined coverage area and said second principal beam having a sidelobe or backlobe which has a beam gain and falls within said first sector in a low elevation portion of said predetermined coverage area;

providing a downward-looking antenna (DLA) coupled to said first BTS for generating a DLA beam having coverage in azimuth corresponding to said first sector, coverage in elevation in said low elevation portion of said predetermined coverage area of said first principal beam, and beam gain greater than that of said sidelobe or backlobe, said first BTS communicating with said subscriber units only on the uplink, downlink communications being carried via said first principal beam; and, operating said first BTS coupled to said DLA in order to control the power of transmissions from a subscriber unit in said first sector within said coverage of said subscriber unit, in order to reduce interference caused by said transmissions received by said second BTS via said sidelobe or backlobe.

* * * * *